United States Patent

[11] 3,568,045

| [72] | Inventor | Robert Yorke |
| | | Southampton, England |
| [21] | Appl. No. | 792,016 |
| [22] | Filed | Jan. 17, 1969 |
| [45] | Patented | Mar. 2, 1971 |
| [73] | Assignee | J. J. Lloyd Instruments Ltd. |
| | | Southampton, England |
| [32] | Priority | Jan. 22, 1968 |
| [33] | | Great Britain |
| [31] | | 3,255 |

[54] ALTERNATING CURRENT DEVICES FOR OBTAINING A 90° PHASE SHIFT
5 Claims, 1 Drawing Fig.

[52] U.S. Cl. .................................................. 323/108,
    323/110, 323/125
[51] Int. Cl. .................................................. G05f 3/00
[50] Field of Search .......................................... 323/108,
    109, 110, 120, 122, 124, 125, 126

[56] References Cited
UNITED STATES PATENTS

| 2,050,067 | 8/1936 | Roberts ..................... | 323/125X |
| 2,264,695 | 12/1941 | Gulliksen ..................... | 323/125X |
| 2,495,158 | 1/1950 | Carlin ........................... | 323/109 |
| 3,211,993 | 10/1965 | Golden et al. ................ | 323/122 |
| 3,259,797 | 7/1966 | Heine et al. .................. | 323/110X |

Primary Examiner—J. D. Miller
Assistant Examiner—A. D. Pellinen
Attorney—Burns, Doane, Benedict, Swecker and Mathis ABSTRACT: An alternating current device for establishing adjustable currents having a 90° phase shift by which the in phase and quadrature components of an applied AC voltage may be measured. The device includes a variable mutual inductor having an in phase resistor in series with the primary winding of the variable mutual inductor and a quadrature resistor in series with the secondary thereof. The in phase and quadrature components of the applied voltage are measured across these resistors. Precise calibration to compensate for phase error and errors due to fluctuations in frequency are obviated by providing a capacitor in parallel with the in phase resistor. In addition, a shunt resistor may be connected across the in phase resistor to reduce the value of mutual inductance required to induce a given current in the quadrature resistor.

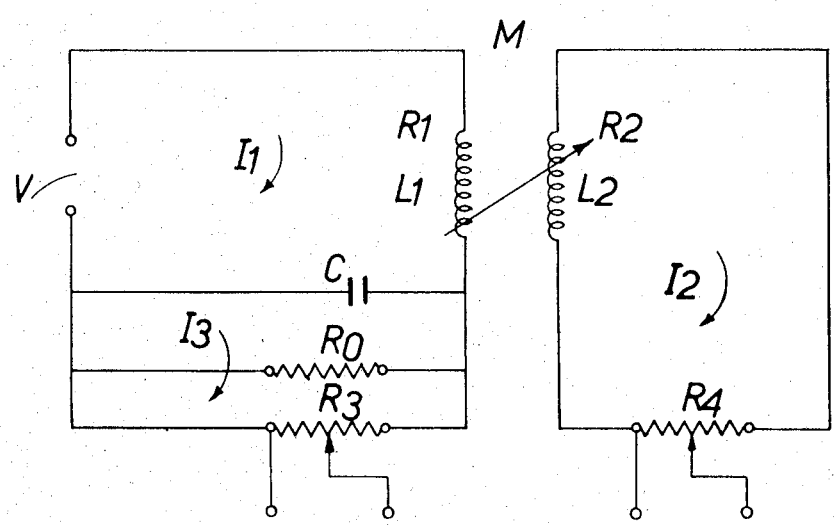
INVENTOR:
ROBERT YORKE
ATTORNEYS:
Burns, Doane, Benedict,
Swecker & Mathis

ALTERNATING CURRENT DEVICES FOR OBTAINING A 90° PHASE SHIFT

This invention relates to alternating current devices for establishing adjustable currents having a 90° phase shift. The invention is especially applicable to alternating current potentiometers and to such potentiometers adapted to work over a wide frequency range.

Various known alternating current potentiometers have one or more of the following disadvantages:

1. Their calibration is dependent on the calibration and subsequent stability of a precision mutual inductor or phase shifting device.
2. They can only be used at one frequency, or alternatively the frequency must be very accurately known and precise adjustments made to the potentiometer to compensate for phase error before use.
3. The adjustments which have to be made to compensate for phase are interdependent on both frequency and the actual current passing through the potentiometer, and for this reason the potentiometer is difficult and tedious to calibrate and use. Furthermore a small change in frequency during the process of taking a measurement often involves the laborious readjustment of both current and phase compensation.

It is an object of this invention to provide an alternating current device for establishing adjustable current having a 90° phase shift between the currents in two resistive circuits, for example, an alternating current potentiometer comprising "in-phase" and "quadrature" resistors, in which no adjustment has to be made to correct for phase error in the "quadrature" resistor.

According to the present invention an alternating current device for establishing a 90° phase-shift comprises an "in-phase" resistor connected in series with a first inductor, a "quadrature" resistor connected in series with a second inductor, and a capacitor shunted across the "in-phase" resistor, the first inductor forming the primary winding and the second inductor forming the secondary winding of a variable mutual inductor, and the capacitance of the capacitor being selected to correct the phase defect caused in the "quadrature" resistor by the voltage drop in the inductance of the second inductor due to the inductance thereof when an alternating current is supplied to the "in-phase" resistor and the first inductor.

The capacitance $C$ of the capacitor is equal to $$\frac{L_2}{R_3(R_2+R_4)}$$

where $L_2$ is the inductance of the second inductor, $R_3$ the resistance of the "in-phase" resistor, $R_2$ the resistance of the second inductor, and $R_4$ the resistance of the "quadrature" resistor. It is a feature of the present invention that a change in the value of the capacitance $C$ results in a very small change or error in the phase shift. For example, we have found that a 10 percent change in the value of the capacitance introduces a change or error in the phase shift of less than 1 percent. For most practical purposes therefore the precise value of the capacitance $C$ may be varied within limits of ± 10 percent.

An additional resistor may be separately shunted across the "in-phase" resistor, in order to reduce the value of mutual inductance required to induce a given current in the "quadrature" resistor.

One embodiment of the invention as applied to an alternating current potentiometer will now be described, by way of example, with reference to the accompanying drawing.

Referring to the drawing, the alternating current potentiometer is a coordinate potentiometer, and comprises an "in-phase" resistor $R_3$, and a quadrature resistor $R_4$. The resistor $R_3$ is connected in series with an inductor having inductance $L_1$ and resistance $R_1$, and the resistor $R_4$ is connected in series with a second inductor having an inductance $L_2$ and a resistance $R_2$. The inductance $L_1$ forms the primary winding, and the inductance $L_2$ forms the secondary winding, of a variable mutual inductor. The resistors $R_3$ and $R_4$ are each in the form of a calibrated voltage divider.

The resistor $R_3$ is connected to an alternating current supply $v$, for example a power oscillator or mains supply. The supply for the resistor $R_4$ is by means of the variable mutual inductor $L_1$, $L_2$. The resistor $R_3$ is shunted separately by a resistor of resistance $R_0$ and a capacitor of capacitance $C$.

The potentiometers $R_3$ and $R_4$ have low residual reactance, and the supply for the resistor $R_4$ is self-compensating for phase so that, that, in use, no adjustment for phase is required over the working frequency range as later described. The inductance $L_2$ is constant.

The resistor $R_0$, which is optional, is included for reducing the maximum value of mutual inductance required to induce a given current in the resistor $R_4$. The value of the capacitance $C$ is selected to correct automatically the phase defect caused by the voltage drop in the inductance $L_2$. It is assumed that the shunt capacitance of the potentiometer $R_4$ is negligible, and this is achieved by careful design.

The value of the capacitance $C$ is derived by the following mathematical analysis, which has been substantiated by extensive laboratory tests:

The equations for the three mesh currents $I_1$, $I_2$, and $I_3$, as indicated by the arrows in the drawing, and ignoring the existence of the resistor $R_0$, are:

$$I_3\left(R_3-\frac{j}{\omega C}\right)+j\frac{I_1}{\omega C}=0 \qquad (i)$$

$$I_1(R_1+j\omega L_1)-j\frac{I_1}{\omega C}+j\frac{I_3}{\omega C}$$
$$=V+j\omega M I_2 \qquad (ii)$$

where $V$ is the voltage of the alternating current supply to the potentiometer $R_3$, $M$ is the mutual inductance of the inductor $L_1$, $L_2$ and $\omega$ is the angular frequency.

$$I_2(R_4+R_2+j\omega L_2)=j\omega M I_1$$

To eliminate $I_1$, and to obtain $I_2$ as a function of $I_3$, we obtain the value of $I_1$ from equation (i) and substitute it into equation (iii), so that:

$$\frac{I_2}{I_3}=$$

$$\frac{j\omega M(R_2+R_4)-\omega^2(R_2+R_4)MCR_3+j(\omega^3 L_2 MCR_3)+\omega^2 L_2 M}{(R_2+R_4)^2+\omega^2 L_2^2}$$

For $I_2$ and $I_3$ to be in quadrature, as required, the real part of $I_2/I_3$ must be zero, so that:

$\omega^2 L_2 M = \omega^2 MCR_3(R_2+R_4)$ or
$L_2 = CR_3(R_2+R_4)$.

Hence the value for $C$ for phase correction is:

$$C=\frac{L_2}{R_3(R_2+R_4)}$$

which, subject to the assumptions mentioned above, is independent of frequency.

When the resistor $R_0$ is provided, the value of $R_3$ is replaced by the combined effective value of the resistors $R_0$ and $R_3$ in parallel.

In one practical embodiment, the alternating current potentiometer is designed to work over a frequency range up to at least 5 kHz. and possibly as high as 10 kHz., and as described above it is not necessary to know the frequency of the test circuit.

The "in-phase" voltage divider $R_3$ is calibrated as usual on direct current against a standard cell and the current is monitored on a conventional transfer instrument. The transfer instrument being a device for establishing an alternating current whose RMS value is equivalent to a given direct current. An alternating current supply is then substituted and its voltage is adjusted until the same current is indicated on the transfer instrument. The transfer instrument is subsequently switched into the quadrature circuit, the current in which is set by adjusting of the mutual inductor $L_1$, $L_2$.

The fundamental range of the practical embodiment is 0 to 1.8 on each voltage divider, and a built-in high-frequency volt-ratio box extends this up to 720 v. It is anticipated that a voltage accuracy of better than ± 0.1 percent or ± ½mv. will be obtainable. The inherent phase defects of the instrument do not exceed six minutes within its working frequency range.

The high inductance of the "in-phase" circuit substantially limits the harmonic content of the potentiometer voltage, thus allowing a nontuned detector such as an ordinary oscilloscope of medium sensitivity to be used. The voltage dividers and auxiliary equipment, including the mutual inductor, transfer instrument, alternating current detector and volt ratio box are all housed in a single case, although facilities are provided for using an external detector if required.

In typical applications, the alternating current potentiometer of the invention is used for measuring the voltage and phase shift developed across an air-cored standard mutual inductor at various frequencies, and for the measurement of the motional impedance of a direct-radiator moving-coil loudspeaker at various frequencies.

The device can also be used for calibrating watt-meters at low power factors and for measuring losses in samples of magnetic materials at various frequencies. In all these applications it becomes necessary to measure the "in-phase" and "quadrature" components of a voltage drop across the device under test and this is done by a balancing of the unknown voltage against two orthogonal voltages obtained by adjusting the "in-phase" and "quadrature" controls on the AC potentiometer.

I claim:

1. An alternating current device for establishing adjustable currents having a 90° phase difference in two resistors comprising an "in-phase" resistor connected in series with a first inductor, a "quadrature" resistor connected in series with a second inductor, and a capacitor shunted across the "in-phase" resistor, the first inductor forming the primary winding and the second inductor forming the secondary winding of a variable mutual inductor, and the capacitance of the capacitor being selected to correct the phase defect caused in the "quadrature" resistor by that component of the voltage drop in the second inductor due to the inductance thereof when an alternating current is supplied to the "in-phase" resistor and the first inductor.

2. A device according to claim 1 wherein the capacitance of the capacitor is $$\frac{L_2}{R_3(R_2+R_4)}$$

± 10 percent where $L_2$ is the inductance of the second inductor, $R_3$ the resistance of the "in-phase" resistor, $R2$ the resistance of the second inductor, and $R_4$ the resistance of the "quadrature" resistor.

3. A device according to claim 2 including an additional resistor shunter across the "in-phase" resistor thereby reducing the mutual inductance required to induce current in the "quadrature" resistor, ($R_3$) being considered to be the resistance of the parallel combination of the additional resistor ($R_p$) and the "in-phase" resistor.

4. A device according to claim 3 wherein the inductance of the second inductor is constant.

5. An alternating potentiometer including an "in-phase" resistor connected in series with a first inductor, a "quadrature" resistor connected in series with a second inductor, and a capacitor shunted across the "in-phase" resistor, the first inductor forming the primary winding and the second inductor forming the secondary winding of a variable mutual inductor, and the capacitance of the capacitor being selected to correct the phase defect caused in the "quadrature" resistor by that component of the voltage drop in the second inductor due to the inductance thereof when an alternating current is supplied to the "in-phase" resistor and the first inductor.